(12) United States Patent
Dropsho

(10) Patent No.: US 9,987,189 B2
(45) Date of Patent: Jun. 5, 2018

(54) MOBILITY ASSISTANCE DEVICE

(71) Applicant: Steven Dropsho, Zurich (CH)

(72) Inventor: Mary Diane Dropsho, Madison, WI (US)

(73) Assignee: Steven Dropsho (CH)

( * ) Notice: Subject to any disclaimer, the term of this patent is extended or adjusted under 35 U.S.C. 154(b) by 0 days. days.

(21) Appl. No.: 15/344,720

(22) Filed: Nov. 7, 2016

(65) Prior Publication Data

US 2017/0128314 A1 May 11, 2017

Related U.S. Application Data

(60) Provisional application No. 62/252,856, filed on Nov. 9, 2015.

(51) Int. Cl.
*A61H 3/02* (2006.01)
*F16B 7/10* (2006.01)
*A61H 3/00* (2006.01)

(52) U.S. Cl.
CPC .......... *A61H 3/0288* (2013.01); *A61H 3/02* (2013.01); *F16B 7/10* (2013.01); *A61H 2003/006* (2013.01); *A61H 2003/007* (2013.01); *A61H 2003/0238* (2013.01); *A61H 2201/0192* (2013.01); *A61H 2201/1635* (2013.01)

(58) Field of Classification Search
CPC .............. A61H 3/0288; A61H 3/02; A61H 2201/0192; A61H 2003/006
USPC .................................................. 135/68, 71
See application file for complete search history.

(56) References Cited

U.S. PATENT DOCUMENTS

| 4,141,375 A | 2/1979 | Tykwinski et al. |
| D258,096 S | 2/1981 | Barfod |
| 4,248,256 A * | 2/1981 | Thomas ............ A61H 3/00 135/67 |
| 4,708,154 A | 11/1987 | Edwards et al. |
| 5,038,811 A | 8/1991 | Gilmore et al. |
| 5,212,900 A | 5/1993 | Perry |
| 5,287,870 A | 2/1994 | Rhodes et al. |

(Continued)

FOREIGN PATENT DOCUMENTS

| DE | 19545600 A1 | 5/1996 |
| ES | 2431414 A1 | 11/2013 |

(Continued)

OTHER PUBLICATIONS

"Crutches by smartCRUTCH," http://vvww.smartcrutch.com/, 2011.

(Continued)

*Primary Examiner* — Noah Chandler Hawk
(74) *Attorney, Agent, or Firm* — Boardman & Clark LLP

(57) ABSTRACT

A mobility assistance device is provided. The device has an elongate post having an upper end and a lower end with the lower end adapted for contact with the ground and the upper end being secured to a forearm support. The forearm support is generally horizontal and is comprised of a platform and a cuff, wherein the platform and the cuff are engagable with a user's forearm, with the cuff being linearly disposed about a longitudinal axis of the platform to hold the user's forearm so that the arm remains in contact with the platform. An upper arm support extends upwardly from the upper end of the vertical elongate post to engage the upper arm of the user.

18 Claims, 3 Drawing Sheets

(56) References Cited

U.S. PATENT DOCUMENTS

| | | | |
|---|---|---|---|
| 5,329,954 A | | 7/1994 | Miyoshi et al. |
| 5,555,904 A | * | 9/1996 | Stockwell ................ A61H 3/02 135/68 |
| 5,564,451 A | | 10/1996 | Hagberg et al. |
| 5,575,299 A | | 11/1996 | Bieri et al. |
| 5,771,910 A | | 6/1998 | Kluttz et al. |
| 6,470,900 B1 | * | 10/2002 | Hamilton ................ A61H 3/02 135/66 |
| 8,474,470 B2 | | 7/2013 | Albertyn |
| 2008/0087312 A1 | | 4/2008 | Sundarrao et al. |
| 2008/0178918 A1 | | 7/2008 | Coe et al. |
| 2009/0114257 A1 | | 5/2009 | Sutton et al. |
| 2009/0235966 A1 | | 9/2009 | Birnbaum et al. |
| 2011/0126872 A1 | | 6/2011 | Albertyn et al. |
| 2012/0067384 A1 | | 3/2012 | Whittaker et al. |
| 2013/0152986 A1 | | 6/2013 | Hunter et al. |
| 2016/0287464 A1 | * | 10/2016 | Younger ................ A45B 9/02 |

FOREIGN PATENT DOCUMENTS

| | | | | |
|---|---|---|---|---|
| FR | 2923379 A1 | | 5/2009 | |
| GB | 123814 A | * | 3/1919 | ............. A61H 3/02 |
| GB | 840944 A | | 7/1960 | |
| JP | 03292956 A | | 12/1991 | |
| KR | 20120096378 A | | 8/2012 | |
| NL | 2000270 C2 | | 4/2008 | |
| WO | 2005041844 A1 | | 5/2005 | |
| WO | 2014210495 A1 | | 12/2014 | |

OTHER PUBLICATIONS

"Ergobaum by Ergoactives," http://www.ergoactives.com/products/ergobaum, accessed Jun. 24, 2015.

"Fulcrum: Forearm Crutch to Cane Combo," http://www.universaldesignstyle.com/fulcrum-forearm-crutch-to-cane-combo/, Aug. 23, 2012.

"International Search Report and Written Opinion of the International Searching Authority," dated Jan. 25, 2017 for International Application No. PCT/US2016/060780, filed Nov. 7, 2016.

"Model 410: Adult Platform Crutch w/Velcro Sleeve," https://www.walkeasy.com/shop/product_details.asp?ProductCode=410, accessed Jun. 24, 2015.

* cited by examiner

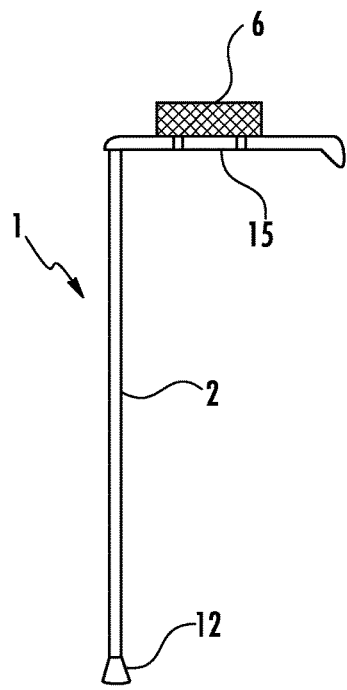
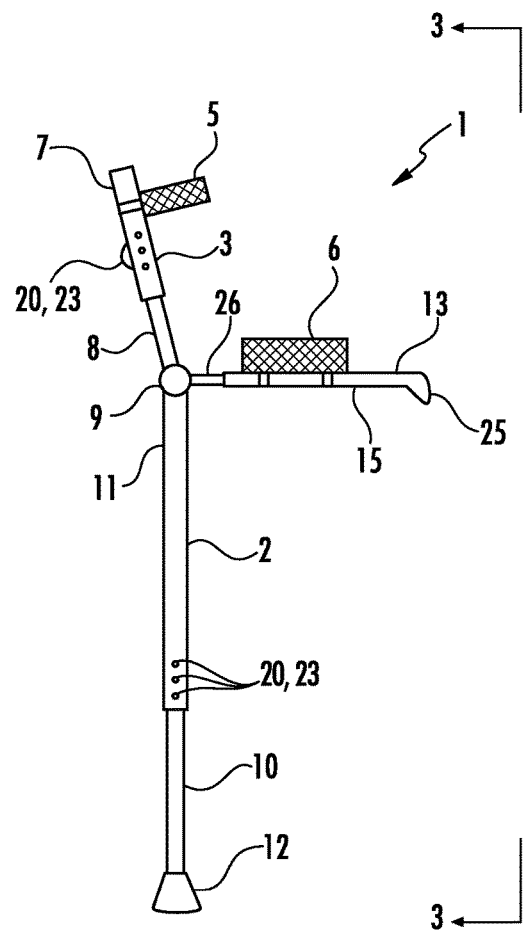
FIG. 1
FIG. 2

MOBILITY ASSISTANCE DEVICE

CROSS-REFERENCE TO RELATED APPLICATIONS

This application claims priority to U.S. Provisional Patent Application, Ser. No. 62/252,856, filed Nov. 9, 2015, entitled "Mobility Assistance Device" the entire contents of which is hereby incorporated by reference herein in its entirety.

FIELD

The present inventions relate to the field of mobility assistance devices. The present inventions more specifically relate to the field of mobility assistance devices, such as crutches, designed to displace weight throughout the user's entire arm.

BACKGROUND

Mobility assistance devices, such as crutches, have traditionally been made such that the majority of the user's weight is placed on the user's wrists and hands, and secondarily a user's arms. These devices are intended to shift the user's weight load from their legs and feet to the wrists and hands in order to take stress off the legs, hips, and feet. The hands and wrists then bear the load, but are not accustomed to such weight and movements as would be required by the crutch. As a user walks, moves, or even stays stationary, the transfer of this weight load puts undue pressure on these joints. Continuous and consistent pressure on these joints can be painful if there are pre-existing conditions such as a sprained wrist or carpal tunnel syndrome. In addition, such use may cause injury, numbness and fatigue in these joints for many users. The transfer of this weight load can also be difficult to manage for the elderly and those individuals with disabilities.

Additionally, current crutches require grip strength to allow the user to grip a handle. Often, those in need of mobility assistance have reduced or no grip strength and need or desire to avoid putting additional pressure on to their hands and wrists. Therefore, a design that removes the weight of the user from the user's wrists and hands as well as the lower limbs and joints is needed. A design which does not require the gripping of a handle to support the user's weight is also needed.

Previous iterations of crutches have introduced forearm cuffs and supports. However, these versions require the gripping of a handle by the user and continue to require the user to support his or her entire weight on the wrist and hands. While prior attempted solutions have focused on increasing stability for the crutch and lessening or dampening the pressure on a user's armpits and hands, displacement of weight from the wrist and hands and removing the need for a hand grip is not fully addressed.

SUMMARY

Accordingly, a mobility assistance device is disclosed. The device has an elongate post having an upper end and a lower end, with the lower end adapted for contact with the ground and the upper end being secured to a forearm support. The forearm support is generally horizontal and is comprised of a platform and a cuff, wherein the platform and the cuff are engagable with a user's forearm, with the cuff being linearly disposed about a longitudinal axis of the platform to hold the user's forearm so that the arm remains in contact with the platform. An upper arm support extends upwardly from the upper end of the vertical elongate post to engage the upper arm of the user.

A mobility assistance device is also disclosed which has an elongate post having an upper end and a lower end. The elongate post is adjustable in length and has the lower end adapted for contact with the ground with a non-slip material thereon. The upper end of the elongate post has a forearm support which is adjustable in length. The forearm support is generally horizontal and is comprised of a platform and a first cuff. The platform and the first cuff are engagable with a user's forearm, with the first cuff being disposed to hold the user's forearm so that the arm remains in contact with the platform. An upper arm support extending upwardly from the upper end of the elongate post is also provided to engage the upper arm of the user. The upper arm support is adjustable in length and has a second cuff on the upper arm support disposed to hold the user's upper arm. The angles between the upper arm support, the forearm support, and the elongate post are adjustable.

A crutch for support of a user is also disclosed. The crutch includes a first telescoping support having a ground engaging end. The first telescoping support is coupled to a ratchet assembly on an end opposite the ground engaging end. A second support is coupled to the ratchet assembly. A third support is also coupled to the ratchet assembly. The second support and third support form respective upper arm and forearm supports and are angularly adjustable relative to one another and relative to the first telescoping support.

Generally, a mobility assistance device or crutch is provided that displaces the user's weight along substantially all of the user's arm and removes or reduces the need for the user to grip and support his or her weight using a handle.

These and other features and advantages of devices, systems, and methods according to this invention are described in, or are apparent from, the following detailed descriptions of various examples of embodiments.

BRIEF DESCRIPTION OF DRAWINGS

Various examples of embodiments of the systems, devices, and methods according to this invention will be described in detail, with reference to the following figures, wherein:

FIG. 1 is a side elevation view of one or more examples of embodiments of a mobility assistance device.

FIG. 2 is a side elevation view of one or more alternative examples of embodiments of a mobility assistance device.

Figure 3:
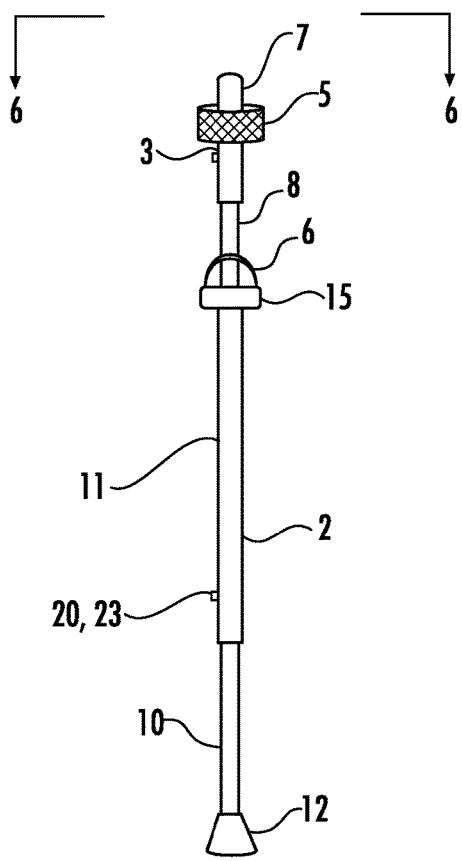
FIG. 3 is a front elevation view of the mobility assistance device shown in FIG. 2, taken from line 3-3 of FIG. 2.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Referring to the Figures, a mobility assistance device or crutch 1 is provided that displaces the user's body weight along the user's arm and removes or reduces the need for the user to grip and support his or her weight using a handle.

In each embodiment, as shown generally herein, the mobility assistance device or crutch 1 has a vertical post or support 2 connected to a floor engaging foot 12 and a horizontal forearm support 15. The floor engaging foot 12 is made of a non-slip material to prevent the foot from slipping or skidding when in contact with the ground. As indicated, the foot 12 is adapted for contact with the ground and engages the ground; and therefore, the foot 12 comprises or includes a ground engaging surface.

The components provided herein, such as the various supports and platforms described, may be formed of durable rigid material which may be easily cleanable. For example, the posts, supports, platforms, and associated components described herein may be formed of metal or metal alloy, carbon or glass fiber reinforced composite, thermoplastic, and/or combinations of the foregoing. The various components herein may also be formed of lightweight material or may be hollow. While "horizontal," "vertical," "upper," and "lower" are used herein, these terms are used to describe general orientation relative to one another and to the ground. These terms and orientations, however, are approximate in nature. For example, the relative component may extend in a plane greater or less than the horizontal or vertical plane.

Referring generally to FIG. 1, a mobility assistance device 1 or crutch according to one or more examples of embodiments includes a vertical elongate post or support 2 forming a lower support. The vertical or lower support in one example of embodiments may be a rod. The vertical elongate post or support 2 has an upper end and a lower end, with the lower end adapted for contact with the ground and the upper end being coupled or secured to a forearm support 15. That is, the lower support or vertical post 2 carries or is connected to a generally or approximately horizontal forearm support 15 on the upper portion or end of the vertical post 2. A foot 12 is received or positioned on the lower portion or lower end of the vertical post or support 2.

In one or more examples of embodiments, the device 1, or various components thereof, are adjustable to provide various heights, angles, configurations, and customization for each user.

Figure 4:
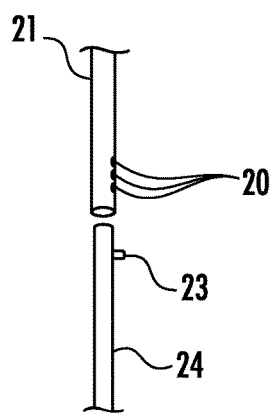
FIG. 4 is a partial perspective view of a pin and aperture adjustment device for use with a telescoping assembly of the mobility assistance device.
Figure 5:
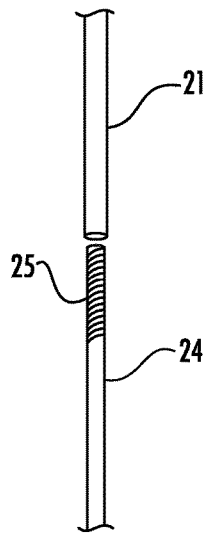
FIG. 5 is a partial perspective view of a threaded adjustment device for use with a telescoping assembly of the mobility assistance device.

To this end, the vertical elongate post 2 may be adjustable in height or length. The vertical post or lower support 2 may, therefore, be adjustable to allow users of differing heights to use the device. Adjustability is accomplished through any suitable approach for modifying the height or length of the device as currently known in the art or as future developed. In one example of embodiments shown in FIGS. 2-3, the lower support 2 has a telescoping shaft formed by two telescoping or slidable or linearly displaceable elements 10, 11. The slidable elements or portions 10, 11 of the telescoping shaft are held in place relative to one another by well-known connections, such as but not limited to, an internally expandable friction lock; threaded fasteners and locknuts; detents or self-locking devices, e.g. clevis pins; or pin and corresponding aperture arrangements; and the like. In a pin 23 and corresponding aperture 20 arrangement, such as shown in FIG. 4, the outer shaft or element 21 contains a series of spaced apertures 20, which may be regularly or irregularly spaced, through which a pin (or pins) 23 may be inserted to secure the inner shaft or element 24 to the outer shaft or element 21. In one example, the pin 23 may be integrally formed into or carried by inner shaft or element 24 and a spring or other suitable biasing means (not shown) may be incorporated to bias the pin outward and thereby impart a self-locking capability to the pin 23 and aperture 20 combination. Alternatively, the inner diameter of one telescoping portion or element 21 and the outer diameter of the other telescoping portion or element 24 may have threads 25, such as shown in FIG. 5, to permit the inner telescoped portion to be screwed into the outer telescoped portion, thereby permitting length adjustment through rotation of one element relative to the other and engagement of the threads 25.

As indicated, the mobility assistance device or crutch has a vertical post or support 2 connected to a floor engaging foot 12 and a horizontal forearm support 15. Referring to FIGS. 1-3 & 6-9, the horizontal forearm support 15 may include a frame structure or support member 26 for support of the user's forearm. In one or more examples of embodiments, the support member is a rod or plurality of rods. The support 26 is connected to or coupled to the lower post 2. In one example, the forearm support 15 is coupled with the vertical elongate post 2 upper end. The support member 26 may be or include a platform 25, which may be or include a cushion. In the illustrated example, the forearm support 15 is generally horizontal and is comprised of a platform 25 and a cuff 6, wherein the platform and the cuff are engagable with a user's forearm.

Figure 8:
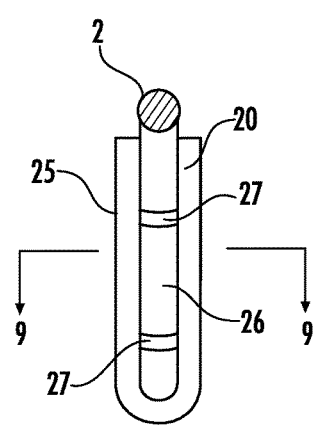
FIG. 8 is a partial bottom view of one example of embodiments of a forearm support platform and adjustment assembly of a mobility assistance device.
Figure 7:
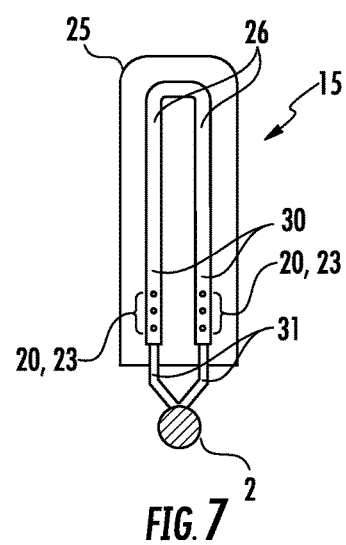
FIG. 7 is a partial bottom view of one example of embodiments of a forearm support platform and adjustment assembly of a mobility assistance device.
Figure 9:
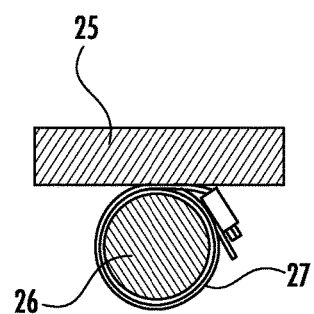
FIG. 9 is a cross-sectional view of the forearm support platform and adjustment assembly shown in FIG. 8, taken from line 9-9 of FIG. 8.

In one example of embodiments shown in FIG. 7, a forearm support 15 may be provided having at least one support rod or member 26 joined to a platform 25. In the illustrated embodiment, the member 26 is joined to the platform 25 below or on a lower surface of the platform 25. The support rod(s) or arm(s) 26 may be integrally formed with the platform, or inserted therein, or alternatively may be formed and separately attached, such as by threaded fastener, adhesive, band clamp, and the like. In one or more examples of embodiments, such as shown in FIGS. 8-9, at least one support rod 26 is joined to the platform 25 by one or more, and preferably a series of clamps 27, such as worm-gear clamps or band clamps, that allow the clamps 27 to be loosened, the support rod 26 and platform to be moved relative to one another (e.g., the platform 25 to be adjusted or removed relative to the support rod 26), and the clamps 27 to be re-tightened to secure the platform 25 in place.

The forearm support 15 may be fixed in length. In an alternative example of embodiments, the forearm support 15 may be adjustable in length to allow it to fit users with differing dimensions (e.g., distances) between the elbow and hand. As can be seen in FIG. 2, a first element or rod 15 may engage a second element, in this case forearm support 15. Alternatively, as shown in FIG. 7, the support member 26 is formed of one or more, and in the illustrated embodiment, two telescoping support arms including elements 30, 31. The support arm(s) 26 may be coupled to the vertical lower post 2, the upper arm support 3 (discussed in further detail below), and/or the joint 9 (discussed in further detail below). The telescoping support arms 26 may comprise telescoping portions or elements 30, 31 held in place and moveable/extendable or retractable in the manner described above with regard to the lower support 2.

As indicated, in one or more examples of embodiments, the forearm support 15 has a cuff, sleeve, or other similar device 6 for receipt of the user's forearm and retention thereof. The cuff 6 may be formed of a pliable material or may be rigid or static. If rigid, the cuff 6 may be formed of plastic or metal and can be a partial or a full circular cross section for receipt of the user's forearm. In one or more examples of embodiments, the cuff 6 is or includes padding. The cuff 6 is linearly disposed about a longitudinal axis of the platform to hold the user's forearm so that the arm remains in contact with the platform 25.

Figure 6:
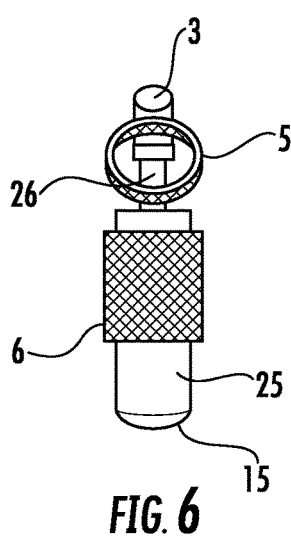
FIG. 6 is a top elevation view of the mobility assistance device shown in FIG. 2, taken from line 6-6 of FIG. 3.

As shown in FIGS. 2-3 & 6, the mobility assistance device or crutch 1 may have a generally vertical lower leg or support 2, a generally horizontal forearm support 15, and an upper arm support 3, which upper arm support 3 may be generally vertical or otherwise extends upwardly above the lower support 2. In one or more examples of embodiments, the upper arm support 3 may be a rod. The upper arm support 3 is secured or connected or coupled to the vertical lower leg 2 and/or horizontal forearm support 15. For example, an upper arm support 3 extends upwardly from the upper end of the vertical elongate post 2 to engage the upper arm of the user. In one or more examples of embodiments, the upper arm support 3 may have an upper arm platform (not shown) or engaging surface and a support structure or frame connected thereto. The support structure may be connected to the platform by fastener, adhesive, band clamp, and the like or combinations thereof. The support structure may also be integrally formed with the platform, or alternatively may be formed and separately attached in the manner described.

The upper arm support has a cuff, sleeve, or other similar device 5 to engage the upper arm to hold the arm support in place on the upper arm support. The cuff 5 is connected to the upper arm support and is engagable with the user's upper arm with the cuff being linearly disposed relative to the longitudinal axis of the upper arm support to hold the user's upper arm so that the arm remains in contact with the upper arm support. The upper arm support cuff 5 is substantially similar to the cuff 6 on the forearm support 15 described hereinabove.

In one or more examples of embodiments, the upper arm support 3 may be adjustable in length or height to allow users of differing heights or with differing upper arm sizes or lengths to use the device. In this regard, the upper arm support member 3 is formed of one or more, and in the illustrated embodiment, two telescoping support arms 7, 8 with at least one of those arms or portions connected to any of the following: the vertical lower post 2, the forearm support 15, and/or the joint 9 (discussed in further detail below). The telescoping support arms may comprise telescoping portions or elements held in place and moveable/extendable or retractable in the manner described above with regard to the lower support 2.

In one or more examples of embodiments, the various supports of the mobility assistance device or crutch 1 are angularly adjustable relative to one another. More specifically, the angle(s) between the upper arm support 3, the forearm support 15, and the vertical elongate post or support 2 are adjustable. In one example, the forearm support 15 is adjustable by rotation of the forearm support relative to the longitudinal axis of the vertical elongate post 2. In this regard, the angle between the forearm support 15 and/or platform 25 and the vertical elongate post 2 is adjustable (as well as the angle between said components and the upper arm support 3). In another example, the upper arm support 3 is adjustable by rotation of the upper arm support 3 relative to the longitudinal axis of the vertical elongate post 2. In this regard, the angle between the upper arm support 3 and the vertical elongate post 2 is adjustable (as well as the angle between said components and the forearm support 15).

In one or more specific examples of embodiments of the crutch or mobility assistance device 1, a joint 9 is provided between the vertical lower post or support 2, the horizontal forearm support 15, and the upper arm support 3. The joint 9 connects these three elements together and may be fixed/static, or may be adjustable. In other words, the lower post 2 may be connected to the upper arm support 3 by joint 9 to allow fixed or differing angles between the lower post 2 and upper arm support 3. In addition, this joint 9 may allow the forearm support 15 to rotate relative to an axis of the lower post 2 to allow various placements of the forearm support 15 in relation to the user. Accordingly, in one example, the adjustable joint 9 allows an angle between the vertical lower post 2 and the upper arm support 3 to be adjusted. The adjustable joint 9 may also permit the angle between the forearm support 15 and either or both the vertical lower post 2 or the upper arm support 3 to be adjusted individually or simultaneously. For example, the adjustable joint 9 allows the forearm support 15 to rotate relative to either or both the vertical post 2 and the upper arm support 3. Likewise, the adjustable joint 9 may permit the rotation of the upper arm support 3 relative to either or both the vertical post 2 and the forearm support 15.

In one or more examples of embodiments, the adjustable joint 9 may have a releasable locking mechanism for releasably securing the various supports in position and retaining the supports in that position. For example, the adjustable joint 9 may be a ball and socket joint with a corresponding tensioner. In another example, the adjustable joint 9 may be a lockable or tightenable ratchet assembly. While specific examples are provided herein, variations thereon would also be acceptable for the purposes provided.

Figure 10:
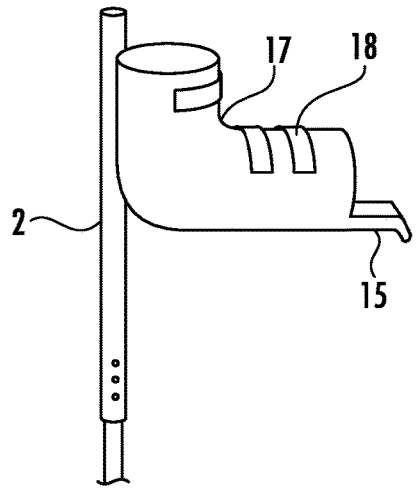
FIG. 10 is a partial side perspective view of a static arm support in one or more alternative examples of embodiments of a mobility assistance device.

In one or more alternative examples of embodiments such as shown, in part, in FIG. 10, the mobility assistance device or crutch includes a static support 17. The static support 17 receives part of the forearm, as well as part of the upper arm and elbow (which may keep the noted area more stable). The static support 17 may be rigid or semi-rigid. In one example, the static support 17 is formed of a hard material such as a hard plastic or a stiff fabric, or a combination thereof. The static support 17 may also be padded for comfort. In one or more example, the static support 17 may be adjustable or expandable in girth to accommodate differing arm size radius. In addition, the static support 17 may be open along its entire length, or may have a means to open the support, such as an overlap or a zipper or buckles, or the like, to allow easy placement of the arm. In this regard, when closed, either side of the static support 17 may overlap the other side or each edge may abut the other opposing edge. The two sides may be attached by any attachment means known in the art 18, which may include, but is not limited to, zippers, straps, buckles, snaps or Velcro® or other hook and eye attachments, and the like.

Accordingly, a crutch 1 for support of a user is disclosed. The crutch 1 may have a first telescoping support having a ground engaging end. The first telescoping support may be coupled to a ratchet assembly on an end opposite the ground engaging end. A second support and a third support may be coupled to the ratchet assembly. The second support and third support form respective upper arm and forearm supports and are angularly adjustable relative to one another and relative to the first telescoping support. The second support and third support may also be telescoping or otherwise adjustable in length.

In one or more examples of embodiments, a kit having a plurality of the crutches or mobility assistance devices such as described herein may be provided. For example, two mobility assistance devices may be provided for use.

An example of use of the mobility assistance device or crutch 1 is discussed in reference to one or more examples of embodiments described herein. A user may adjust the length or height of the lower support 2 to correspond with the user's height (such that the user's forearm is properly and comfortably aligned when on the forearm support). The user may also adjust the length of the forearm support 15 to correspond with the user's forearm length. The user may further adjust the length or height of the upper arm support 3 to correspond with the height or length of the user's upper arm. The user may adjust the angle of the forearm support 15, and the upper arm support 3 relative to one another and relative to the lower support 2. Once suitable adjusted for height, length, and angle, the user may insert his or her arm into the cuffs 5, 6 on the upper arm support 3 and forearm support 15 for use. The cuffs may be secured to the user's arm if provided or needed.

As discussed herein, the mobility assistance device provides various advantages over existing devices. In one example, the mobility assistance device displaces the user's body weight along substantially all of the user's arm and removes or reduces the need for the user to grip and support his or her weight using a handle, reducing stress on the wrist, hand, and armpit and increasing stability. In this regard, the mobility assistance device provides advantages of allowing the user to support his or her weight using more of the arm and preventing wrist injury, among others. The mobility assistance device advantageously can be used by individuals with less strength in the wrist and hand because the device engages a large portion of the arm for support.

In addition to the foregoing advantages, the mobility assistance device described and claimed herein is lightweight yet durable, and is easy and inexpensive to manufacture and clean.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top," "bottom," "upper," "lower," "horizontal," "vertical") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

The invention claimed is:

1. A mobility assistance device comprising:
an elongate post having an upper end and a lower end, with the lower end adapted for contact with the ground and the upper end having a forearm support;
wherein the forearm support is generally horizontal and is comprised of a platform and a cuff, wherein the platform and the cuff are engagable with a user's forearm, with the cuff being disposed to hold the user's forearm so that the arm remains in contact with the platform; and an upper arm support extending upwardly from the upper end of the elongate post to engage the upper arm of the user;

wherein the forearm support is directly coupled with the elongate post upper end, and the upper arm support is directly coupled with the elongate post upper end; and wherein an angle between the forearm platform and the elongate post is adjustable.

2. The mobility assistance device of claim 1, wherein the forearm support is adjustable by rotation of the forearm support relative to a longitudinal axis of the elongate post.

3. The mobility assistance device of claim 1, wherein the upper arm support is adjustable by rotation of the upper arm support relative to a longitudinal axis of the elongate post.

4. A mobility assistance device comprising:

an elongate post having an upper end and a lower end, with the lower end adapted for contact with the ground and the upper end having a forearm support;

wherein the forearm support is generally horizontal and is comprised of a platform and a cuff, wherein the platform and the cuff are engagable with a user's forearm, with the cuff being disposed to hold the user's forearm so that the arm remains in contact with the platform; and an upper arm support extending upwardly from the upper end of the elongate post to engage the upper arm of the user;

wherein the forearm support is directly coupled with the elongate post upper end, and the upper arm support is directly coupled with the elongate post upper end; and wherein an angle between the upper arm support and the elongate post is adjustable.

5. A mobility assistance device comprising:

an elongate post having an upper end and a lower end, with the lower end adapted for contact with the ground and the upper end having a forearm support;

wherein the forearm support is generally horizontal and is comprised of a platform and a cuff, wherein the platform and the cuff are engagable with a user's forearm, with the cuff being disposed to hold the user's forearm so that the arm remains in contact with the platform; and an upper arm support extending upwardly from the upper end of the elongate post to engage the upper arm of the user;

wherein the forearm support is directly coupled with the elongate post upper end, and the upper arm support is directly coupled with the elongate post upper end; and wherein angles between the upper arm support, the forearm support, and the elongate post is adjustable.

6. The mobility assistance device of claim 5 wherein the ground engaging portion of the elongate post comprises a non-slip material.

7. The mobility assistance device of claim 5, wherein the cuff is a first cuff, and further comprising a second cuff on the upper arm support disposed to hold the user's upper arm.

8. The mobility assistance device of claim 5 wherein the elongate post is adjustable in length.

9. The mobility assistance device of claim 5 wherein the forearm support is adjustable in length.

10. The mobility assistance device of claim 5 wherein the upper arm support is adjustable in length.

11. The mobility assistance device of claim 5, wherein the forearm support is coupled to a joint coupled to the elongate post upper end, and the upper arm support is coupled to the joint.

12. A kit having a plurality of the mobility assistance devices of claim 5.

13. A mobility assistance device comprising:

an elongate post having an upper end and a lower end, the elongate post being adjustable in length and having the lower end adapted for contact with the ground with a non-slip material thereon, and the upper end directly coupled with a forearm support which is adjustable in length, wherein the forearm support is generally horizontal and is comprised of a platform and a first cuff, wherein the platform and the first cuff are engagable with a user's forearm, with the first cuff being disposed to hold the user's forearm so that the arm remains in contact with the platform;

an upper arm support extending upwardly from and directly coupled with the upper end of the elongate post to engage the upper arm of the user, the upper arm support being adjustable in length and having a second cuff on the upper arm support disposed to hold the user's upper arm; and wherein angles between the upper arm support, the forearm support, and the elongate post are adjustable.

14. A crutch for support of a user, the crutch comprising:

a first telescoping support having a ground engaging end, the first telescoping support coupled to a ratchet assembly on an end opposite the ground engaging end, the ratchet assembly comprising a wheel having teeth so that motion can be imparted to the wheel, governed, or prevented;

a second support coupled to the ratchet assembly; and a third support coupled to the ratchet assembly;

wherein the second support and third support form respective upper arm and forearm supports and are angularly adjustable relative to one another and relative to the first telescoping support.

15. The crutch of claim 14, further comprising a first cuff on the second support and a second cuff on the third support, which cuffs are disposed to receive a portion of a user's arm.

16. The crutch of claim 14, wherein the second support is a telescoping support.

17. The crutch of claim 14, wherein the third support is a telescoping support.

18. A kit having a plurality of the crutches of claim 14.

* * * * *

UNITED STATES PATENT AND TRADEMARK OFFICE
CERTIFICATE OF CORRECTION

PATENT NO. : 9,987,189 B2
APPLICATION NO. : 15/344720
DATED : June 5, 2018
INVENTOR(S) : Dropsho Page 1 of 1

It is certified that error appears in the above-identified patent and that said Letters Patent is hereby corrected as shown below:

In the Claims

In Column 9, Line 50, in Claim 5, delete "is adjustable." and insert -- are adjustable. --, therefor.

Signed and Sealed this
Twenty-fifth Day of September, 2018

Andrei Iancu
*Director of the United States Patent and Trademark Office*